United States Patent [19]

Yoshida

[11] Patent Number: 4,949,323

[45] Date of Patent: Aug. 14, 1990

[54] DISK REPRODUCTION APPARATUS AND METHOD FOR HIGH SPEED ACCESSING OF DESIRED INFORMATION DATA BY CHECKING ADDRESS DATA

[75] Inventor: Takuji Yoshida, Tokyo, Japan

[73] Assignee: Kabushiki Kaisha Toshiba, Kawasaki, Japan

[21] Appl. No.: 228,213

[22] Filed: Aug. 4, 1988

[30] Foreign Application Priority Data

Aug. 7, 1987 [JP] Japan .................... 62-197517

[51] Int. Cl.$^5$ ............................................. G11B 7/00
[52] U.S. Cl. ................................ 369/32; 369/44.11; 369/59; 369/57; 360/72.1
[58] Field of Search ............... 369/32, 33, 43–47, 369/59, 54, 56, 57; 360/72.1, 72.2, 78.01, 78.04

[56] References Cited

U.S. PATENT DOCUMENTS 4,106,058  8/1978  Romeas et al. .................... 369/32
4,800,549  1/1989  Yamagami et al. ............... 369/59 X

FOREIGN PATENT DOCUMENTS

3515472  11/1985  Fed. Rep. of Germany .

Primary Examiner—Robert L. Richardson
Attorney, Agent, or Firm—Cushman, Darby & Cushman

[57] ABSTRACT

When receiving address data of a target position from a host computer, a control unit reads the present address data of a pick-up using a subcode Q detector or a header detector. The control unit computes a difference between the present address data as read out and the address data of the preceding frame (one block) already read out and stored in RAM. The control unit then checks if the difference is within a preset value. If it is, the control unit decides that the present address data is correct, and uses it in the data access operation. If it is not, the control unit computes a difference between the address data at the target position as specified by the host computer and the present address. The control unit then checks to see if the difference is within a preset value. If it is, the present address data is correct it is used in the data access operation.

15 Claims, 3 Drawing Sheets

DISK REPRODUCTION APPARATUS AND METHOD FOR HIGH SPEED ACCESSING OF DESIRED INFORMATION DATA BY CHECKING ADDRESS DATA

BACKGROUND OF THE INVENTION

1. Field of the Invention

This invention relates to a disk reproduction apparatus such as a CD (compact disk) player or and CD-ROM (read only memory) player. The invention also relates to a method of making high speed accesses to a disk reproduction apparatus.

2. Description of the Related Art

Digital record/playback apparatuses are currently winning a larger and larger market share of the acoustic equipment market. This trend is due to the benefits of high density audio recording and of playing back the high density recorded audio data with a good fidelity. This technology is often called a digital audio technology.

The digital acoustic systems are theoretically superior to analog acoustic systems. Audio characteristics are independent of the characteristics of the recording medium. Audio systems employing disks for their recording mediums are called DAD (digital audio disk) systems. Playback systems for playing back audio data from recorded disks (recorded disks are generally employed in DAD systems typically contain an optical playback system, an electrostatic playback system, a mechanical playback system, and the like.

Of optical playback systems, the optical disk player using a CD is the most typical. Geometrically, a CD is 12 cm in diameter and 1.2 mm in thickness. Structurally, a CD is a transparent disk made of synthetic resin and covered with a metal thin film with circularly arrayed pits. These pits represent digital data as obtained by pulse-code-modulating (PCM) the analog acoustic information as picked up. The disk is rotated at a rotating speed in the range from approximately 500 to 200 rpm. A CLV (constant linear velocity) system is used for driving the disk. For playing back acoustic data from the disk, an optical pick-up (involving a semiconductor laser, a photo-electric conversion element, and the like) is linearly moved from the inner peripheral side to the outer peripheral side of the disk. A linear tracking system is used for moving the pick-up. A disk with a 1.6 $\mu$m track pitch is capable of storing a great amount of acoustic information. A single side of the disk stores enough acoustic data to provide one hour of continuous stereo sound.

There are two types of data stored on the disk: digital audio data from the digitized audio signal for stereo playback, and subcode data for providing good operability and highly sophisticated functions. The subcode data includes eight types of data denoted as P to W, and has a total of 8 bits each for one frame (588 channel bits).

Of the eight types of subcode P to W, subcode P represents a point where one musical piece is changed to another in the disk. Six subcodes R to W are for displaying an image on a CRT display of a television set. This image can be synchronized with the digital audio data. Subcodes R to W are applied to a decoder, which is specially designed for image display. A still picture is then displayed on the display under control of the decoded data from the decoder.

Subcode Q is also called address data. This data is and stored in a program area radially ranging from 25 to 58 mm on the disk. This address data contains a musical piece number (track number: TNO) of each musical piece stored, a measure number (INDEX), time lapse (TIME) of each musical piece from the instant that its playing begins, and a total time lapse (ATIME) from the starting point of the program area.

The disk further stores TOC (table of contents) data in the read-in area ranging 23 to 25 mm. TOC data represents the start position (address) of each musical piece in terms of a total lapse time.

Thus, a great amount of data is recorded on the disk. The particular disk player used with this disk must search for the intended data from the large amount of data at the highest possible speed. The search function is therefore an essential feature of the disk player. It is subcode Q which is used for executing the search function.

The CD player mentioned above was originally developed to playback musical data. The large memory capacity of the CD, however, provides another use of the CD. This new use of the CD is known as a CD-ROM reproduction apparatus. In this system, the CD is used as a ROM or a read only recording medium. Many types of digital data can be stored in the memory area typically used for storing audio data in conventional CD players. To record and reproduce the digital data, the CD-ROM reproduction apparatus employs a conventional record/playback format. Additionally, a new format is also used. The two formats will be described below.

In CD playback systems, analog audio signals of two channels (L and R) are sampled at 44.1 kHz. The sampled data is digitized and recorded onto the CD as 16-bit digital audio data. In CD-ROM reproduction systems, on the other hand, the 16-bit digital audio data of both channels is divided into two pieces of data, each including 8 bits (one byte data). The digital data is stored as a data unit (one block) of 2352 bytes. One block of data includes:

(1) Sync pattern for checking the start of each block (12 bytes);

(2) Header address as the address data of the block (every 1/75 sec.), which corresponds to subcode Q (4 bytes);

(3) Data for user (2048 bytes=2 K bytes); and (4) Data for data error detection and correction (mode I) or data for user (mode II) (288 bytes).

Mode I is used when data error cannot be corrected by the parity correction for both channels C1 and C2 in the audio data playback format. If Mode I is used, the error rate can be improved up to $10^{-12}$. This low error rate enables the CD to be used as the recording medium for a computer.

Mode II allows the operator to use the memory area of 288 bytes. When Mode II is used, the error rate is $10^{-9}$ at most, but the amount of usable data in one block is increased to:

2048+288=2336 bytes.

Incidentally, one block corresponds to one frame of subcode. One block of data is reproduced every 1/75 sec. In Mode I, this is 2 K bytes of data per block. The data transfer rate of the CD-ROM reproduction system is $2K \times 75 = 150$ K bytes/sec.

Therefore, in the case of the disk which is used in the CD-ROM reproduction system and has a memory capacity of the data providing one-hour continuous playing on each side, the data recorded therein is 150 K bytes $\times 60 \times 60 = 540$ M bytes.

The memory capacity of the CD amounts to that of normal floppy disks of 500 to 1000 or 270,000 documents each containing 200 letters written therein. In this respect, the CD-ROM disk is a data recording medium featuring a low error rate and a tremendously large storage capacity. A portion of the CD-ROM disk may be used, if necessary, for digital data storage, while the remaining portion of the disk can be used for digital audio data storage. Thus, the digital data and the audio data may simultaneously be recorded onto the disk by switching the control bit of subcode Q according back and forth between digital data and audio data.

The CD-ROM disk is a data recording medium. To process the data recorded, therefore, a host system or a host computer is required. In use, an operator operates a keyboard of the host computer, to cause the host computer to send a command to the CD-ROM reproduction apparatus. In response to the command, the reproduction apparatus searches for the address of the desired data. Following the search, the reproduction apparatus transfers the data specified by the searched address, back to the host computer.

Because CD-ROM reproduction apparatuses are used as a data memory apparatuses, high speed data access is a desirable performance feature. To make a data access, a, conventional CD disk uses subcode data Q. The CD-ROM disk, on the other hand, uses the header address data. Therefore, if the subcode data Q (in the case of the CD-ROM disk, the header address data) read out is incorrect, the data access cannot be done at a high speed. To solve this problem, the conventional CD player checks the continuity of subcode Q at the present position of the pick-up and subcode data Q read out previously by one frame before. (one block) If the addresses are continuous, the present subcode data Q as read out is deemed correct.

The above method, however, still has problems. In the above method, it is assumed that the pick-up is moved for data access, it is assumed that the pick-up reads out subcode data Q, and it is assumed that the first data Q read out is correct. In the conventional CD-ROM reproduction apparatus, a controller decides whether or not the data first read out data is incorrect or invalid. The time required to make this decision is wasteful and slows the data access.

More specifically, the subduring code data Q first read out following the pick-up movement, is not continuous with the data last read out before the movement. Therefore, the controller decides that the first read out subcode Q is invalid. Then, the controller decides a continuity of the subcode data Q first read out after this movement and the subcode data Q read out after a time elapse amounting to one frame (one block) reproduction from that position. If these data are continuous, the controller decides that the subcode data Q is correct. The time it takes the pick-up to reproduce one frame after the pick-up moves (1175sec.) is wasted time. This time loss hinders the high speed data access operation.

SUMMARY OF THE INVENTION

Accordingly, an object of the present invention is to provide a disk reproduction apparatus which may exactly decide whether or not the picked up address data is correct, and may make a high speed data access.

Another object of the present invention is to provide a method for making high speed data accesses in disk reproduction apparatuses.

According to one aspect of the present invention, there is provided a disk reproduction apparatus for reproducing the intended data that is picked up by pick-up means from a disk in which a great amount, of data is stored in the form of data blocks. Each of these data blocks includes a predetermined number of data units, each with different address data. The disk reproduction apparatus is capable of moving the pick-up means to an externally set target position at a high speed using the address data at the target position and the address data picked up by the pick-up means. The disk reproduction apparatus comprises: memory means for storing address data contained in the preceding data block picked up by the pick-up means, first calculating means for calculating a difference between the address data stored in the memory means and the address data currently picked up by the pick-up means, second calculating means for calculating a difference between the address data picked up by the pick-up means and the address data at the externally set target position, and control means, for deciding that the address data picked up by the pick-up means is correct and for executing a predetermined processing. The control means makes the decision when either of the differences calculated by the first and second calculating means is within the corresponding preset value.

According to another aspect of the present invention, there is provided a disk reproduction apparatus for reproducing the intended data that is picked up by pick-up means from a disk in which a great amount of data is stored in the form of data blocks, each including a predetermined number of data units with different address data, the disk reproduction apparatus being capable of moving the pick-up means to an externally set target position at a high speed using the address data at the target position and using the address data picked up by the pick-up means. The disk reproduction apparatus comprises: memory means for storing address preceding contained in the data block picked up by the pick-up means, first calculating means for calculating a first difference between the address data stored in the memory means and the address data currently picked up by the pick-up means, first decision means for checking if the first difference is within a first preset value, second calculating means for calculating a second difference between the address data picked up by the pick-up means and the address data at the externally set target position, when the first decision means decides that the second difference is not within the first preset value, second decision means for checking if the second difference calculated by the second calculating means is within a second preset value, and control means, for deciding that the address data picked up by the pick-up means is correct and for executing a predetermined processing. The control means makes the decision when the first decision means decides that the first difference is within the first preset value, and also when the second decision means decides that the second difference is within the second preset value.

According to yet another aspect of the present invention, there is provided a method of making a high speed access in a disk reproduction apparatus for reproducing the intended data that is picked up by pick-up means from a disk in which a great amount of data is stored in the form of data blocks, each including a predetermined number of data units with different address data, the method comprising the steps of: externally setting the address data at a target position, storing the address data contained in the data as preceded one data block picked up by the pick-up means, calculating a first difference between the previous address data as stored and the address data currently picked up by the pick-up means, checking if the first difference is within a first preset value, calculating a second difference between the address data picked up by the pick-up means and the address data at the externally set target position, when the first difference is not within the first preset value, checking if the second difference calculated is within a second preset value, and deciding the address data picked up by the pick-up means to be correct and executing a predetermined processing when the first difference is within the first preset, and also when the second difference is within the second preset value.

DETAILED DESCRIPTION OF THE PREFERRED EMBODIMENTS

A preferred embodiment of a disk reproduction apparatus according to the present invention is described referring to the accompanying drawings.

Figure 1:
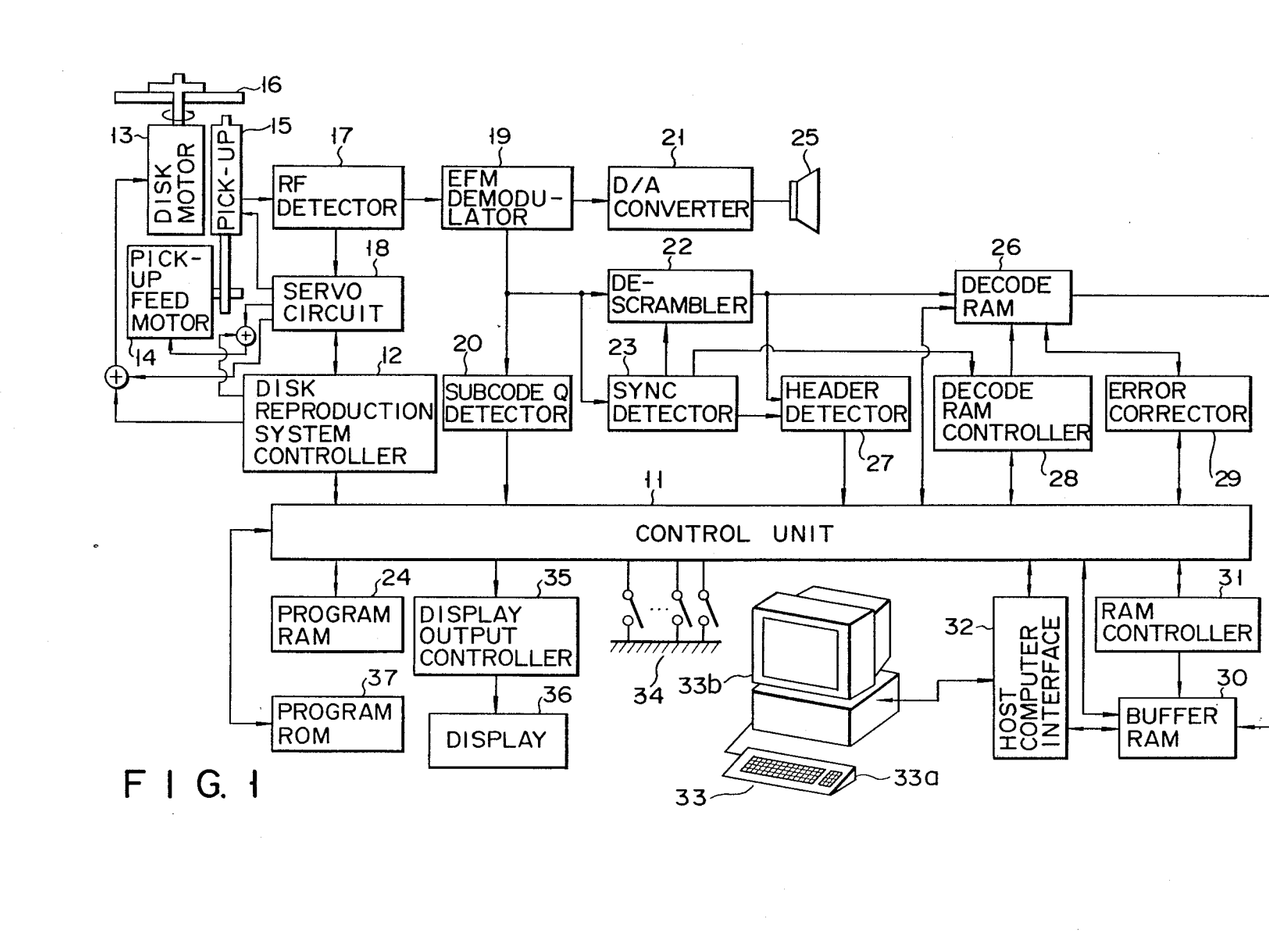
FIG. 1 shows a block diagram illustrating an embodiment of a disk reproduction apparatus according to the present invention.

FIG. 1 is a block diagram of a CD-ROM reproduction apparatus incorporating this invention.

In the figure, control unit 11 sends an access command to disk reproduction system controller 12. In response to this command, disk reproduction system controller 12 drives disk motor 13 and pick-up feed motor 14. A laser diode (not shown) contained in pick-up 15 is turned on. Pick-up 15 picks up data from disk 16.

The data is picked up as an EFM (eight to fourteen modulation) signal and supplied to RF detector 17. This detector 17 appropriately amplifies the EFM signal, and separates it into two signals. One signal is supplied to servo circuit 18 and the other signal is supplied to EFM demodulator 19. Servo circuit 18 generates various types of servo signals. These signals may comprise a focus servo signal and a tracking servo signal are directed to pick-up 15, a linear tracking servo signal directed to pick-up feed motor 14, and a CLV servo signal directed to disk motor 13. Each servo control is executed by these servo signals as well as a control signal generated by control unit 11 via disk reproduction system controller 12.

EFM demodulator 19 waveshapes the EFM signal derived from RF detector 17, and separates a sync signal from the EFM signal. The separated sync signal is subcode data. The sync signal is supplied to subcode Q detector 20. The signal with no sync signal is supplied to D/A (digital to analog) converter 21, descrambler 22, and sync detector 23. If the subcode Q (address data) detected by subcode Q detector 20 is TOC (table of contents) data of a read-in area of the disk, it is stored into program RAM (random access memory) 24 under control of control unit 11. The stored TOC data is used in the search operation.

Incidentally, the read-in area radially, ranges from 23 to 25 mm on the disk. The output of D/A converter 21 undergoes error correction and error compensation. It is then supplied to speaker 25, to produce sound.

The circuit described above is that of the conventional CD disk player. The addition of the circuit described below to the above music playback arrangement forms a CD-ROM reproduction apparatus. A signal output from EFM demodulator 19 is supplied to sync detector 23, which detects CD-ROM block sync signals. The output of EFM demodulator 19 is also supplied to descrambler 22. This descrambler 22 descrambles the EFM demodulated signal from EFM demodulator 19 according to predetermined rules, in response to the sync signal from sync detector 23. The descrambled data from one block is then written into decode RAM 26.

Figure 2:
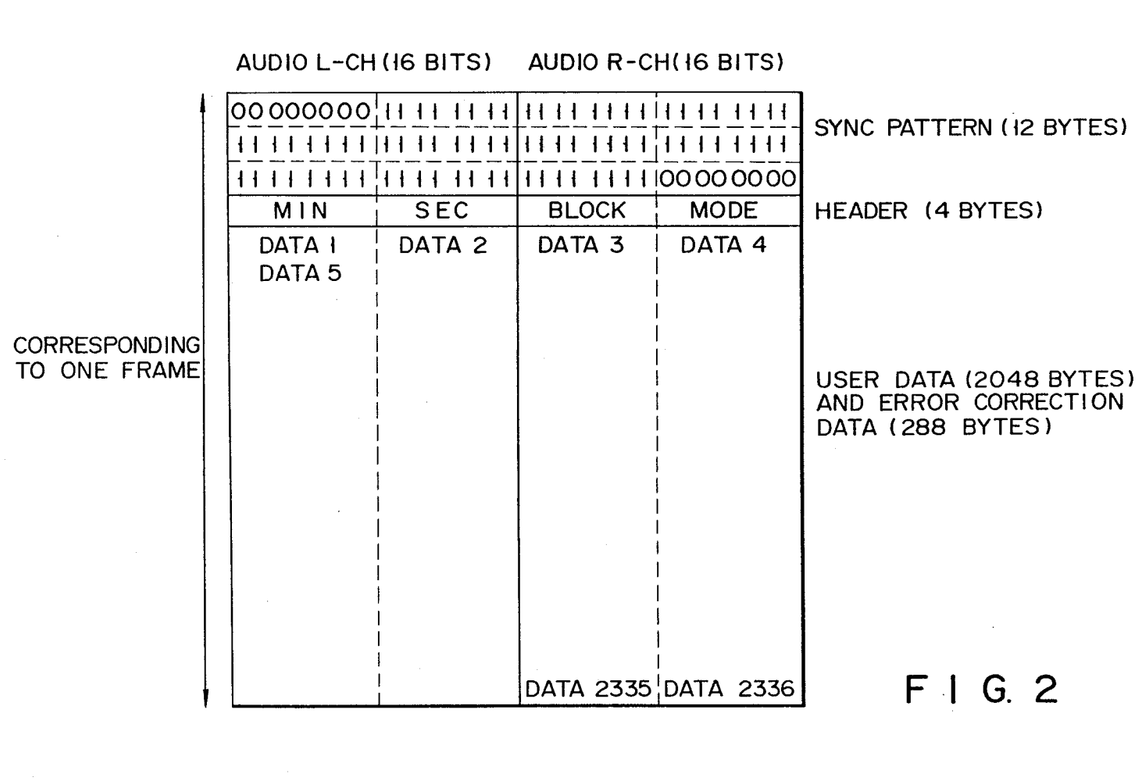
FIG. 2 shows a data format used in the CD-ROM reproduction system.

As is shown in FIG. 2, the data of one block includes:

(1) Sync pattern for checking the start of each block (12 bytes);

(2) Header address as the address data of the block (every 1/75 sec.), which corresponds to subcode Q (4 bytes);

(3) Data for user (2048 bytes=2 K bytes); and (4) Data for data error detection and correction (mode I) or data for user (mode II) (288 bytes).

This one block corresponds to one frame of the subcode in the CD reproduction system. The data signal from descrambler 22 is also supplied to header detector 27. Header detector 27 detects only the header address data contained in the block data. To search for desired data, control unit 11 uses subcode Q and the header address data output from header detector 27. The related standard in this field allows a maximum of 1 sec. difference between subcode Q and the header address data. Therefore, the final search operation is always performed by using the header address data.

Control unit 11 controls decode RAM controller 28 to read out the data from decode RAM 26. Control unit 11 then uses predetermined error detection in reading the data. If the data contains an error, decode RAM controller 28 and error correcting circuit 29 correct the error in the data stored in decode RAM 26.

The error corrected data is loaded into buffer RAM 30, from decode RAM 26. The loaded data is only the user data, not all the data contained in RAM 26. This selective data transfer to buffer RAM 30 is executed by RAM controller 31 under control of control unit 11.

After all the desired data is loaded into buffer RAM 30, control unit 11 sends a data read request signal to host computer 33 via host computer interface 33. When ready for the data, host computer 33 returns a predetermined signal to control unit 11 via host computer interface 32. Upon receipt of this signal, control unit 11 controls the user data address in buffer RAM 30 by using RAM controller 31, and transfers the data to host computer 33.

Control unit 11 normally receives commands from host computer 33 via host computer interface 32 and then operates the CD-ROM reproduction apparatus according to those commands. Alternatively, an operator may operate keys on keyboard 33a of host computer 33 and cause host computer 33 to generate the commands. These commands place the disk reproduction apparatus in a predetermined condition. In this embodiment key switch group 34 is provided in control unit 11 for providing some simple operations when the CD-ROM reproduction apparatus is not coupled with the host computer.

The data is usually displayed by CRT 33b of host computer 33. This embodiment uses display 36 for simple data display when it is not coupled with host computer 33. Display 36 is driven by display output controller 35 under control of control unit 11.

Program RAM 24 and program ROM 37 store predetermined programs to drive control unit 11.

The described CD-ROM reproduction apparatus provides a reliable external memory apparatus of large capacity.

To effectively use such a memory apparatus, however, a high speed data access is indispensable. The data access of the normal CD-ROM reproduction apparatus, therefore, is performed as follows:

(A1) An operator operates the keyboard 33a of host computer 33. In response to the operation, host computer 33 sends a command to access the CD with a specified header address, to control unit 11 of the CD-ROM reproduction apparatus via host computer interface 32.

(A2) Control unit 11 controls subcode Q detector 20 to read out the subcode Q on disk 16 located at the present position of pick-up 15. Subcode Q, which is provided under the audio CD standard, is stored in a program area radially ranging from 25 to 58 mm on disk 16. Subcode Q represents a musical piece or track number (TNO) of each musical piece stored, a measure number (INDEX), time lapse (TIME) of each musical piece from the instant that its playing begins, and a total time lapse (ATIME) from the starting point of the program area. ATIME will be referred to as an absolute address. In a read-in area, which is located more innerly than the program area on disk 16 and radially ranges from 23 to 25 mm, the subcode data Q contains the data (TOC) representing the start address of each music piece and a time elapse in the read-in area.

(A3) The number of tracks existing between the start position of the program area and the position of the absolute address T is generally expressed by $$N = (VT/\pi tp) + (ri/tp)^2 - (ri/tp)$$

where
ri : radial position of the start of the program area,
tp : track pitch,
V : linear velocity of the disk, and a constant within the same disk.

As seen from the above relation, if an absolute address T is selected, we have the number of tracks N laid between the absolute address T and the start of the program area.

In this step, control unit 11 computes the number of tracks $N_{OBJ}$ laid between the program area start position and a target position. The computation uses the header address data of the target position as obtained in step A1. control unit 11 executes the oration by using the operation program containing the above relation, which is stored in program ROM 37. Control unit 11 further computes the number of tracks $N_{PRS}$ existing between the program area start position and the present position, from the subcode data Q at the present position as read out in step A2. The numbers of tracks $N_{OBJ}$ and $N_{PRS}$ are stored into program RAM 24.

(A4) Control unit 11 executes the operation of the following relation by using track numbers $N_{OBJ}$ and $N_{PRS}$ as obtained in step A3 under control the operation program of program ROM 37;

$$N_{DIF} = N_{OBJ} - N_{KPRS}.$$

That is, control unit 11 computes the number of tracks $N_{DIF}$ existing between the present position of pick-up 15 and the target position, viz., the number of tracks to be crossed by pick-up 15. When $N_{DIF} > 0$, pick-up 15 is moved toward the outer periphery side of disk 16. When $N_{DIF} < 0$, it is moved toward the inner periphery side.

(A5) Control unit 11 transfers the data of the moving direction of pick-up 15, and the data of the number of tracks $N_{DIF}$ to disk reproduction system controller 12. Disk reproduction system controller 12 drives pick-up feed motor 14 through servo circuit 18, according to the moving direction data and the number-of-tracks $N_{DIF}$ data, to finally move pick-up 15 a desired distance.

(A6) Control unit 11 reads out the subcode data Q after pick-up 15 is moved, by subcode Q detector 20. A sequence of the operations in steps A2 to A5 is repeated until a difference between the read out address and the address at the target position as specified in step A1, falls below a preset value. A single computation of the number of tracks $N_{OBJ}$ in step A3 suffices.

(A7) When the address difference between the present position of pick-up 15 and the target position falls below the preset value, control unit 11 executes the same sequence of operations as in steps A2 to A5. Accordingly, the header address data read by header detector 27 is used in place of the subcode data Q read in step A2. As described above, the subcode data Q, not the header address data, is used in the first half of the access operation, follows. The reason for this is that the CD-ROM standard allows both a musical area and a data area on disk 16. Therefore, an area with no header address data exists.

(A8) Pick-up 15 is progressively moved across tracks and reaches the target position within one track. Control unit 11 then generates a command to start reproduction. This command is sent to servo circuit 18, through disk reproduction system control circuit 12. Control unit 11 then waits until the desired data is written into decode RAM 26 through the operation of descrambler 22 and sync detector 23.

(A9) Using decode RAM 28, control unit 11 checks if the data in decode RAM 26 contains an error. If necessary, it executes error correction using error correcting circuit 29. If no error is contained, control unit 11 transfers the data of decode RAM 26 to buffer RAM 30, by RAM controllers 28, 31. Subsequently, it sends a signal indicating the completion of the access to host computer 33, via host computer interface 32. In response to the read request signal from host computer 33, control unit 11 fetches the data from buffer RAM 30 and sends it host computer 33. The access operation then ends.

As seen from the foregoing description of the data access, a difference between the present position of pick-up 15 and the target position is obtained by using both the subcode data Q read from disk 16 and also the header address data. Pick-up 15 is moved according to the obtained difference. Therefore, if the read-out data contains an error, pick-up 15 would be moved to a position different from the intended position.

Let us consider the following case. The absolute address of the target position is 60 minutes (the outermost periphery of disk 16) and the absolute address of the present position is 50 minutes. Pick-up 15, however, mistakenly read out 0-minute absolute address of the present position. The correct moved distance of pick-up 15 amounts to ten minutes, because 60 minutes−50 minutes=10 minutes.

Actually, however, the read out absolute address is 0 minutes. Therefore, pick-up 15 is moved a distance amounting to 60 minutes since 60 minutes−0 minute=60 minutes.

This distance of 60 minutes moves pick-up 15 outside disk 16. If so, pick-up 15 is returned toward the inner peripheral side of the disk, and then the focus search is performed again. The access operation must be restarted. This situation must be avoided if high speed data access is to be realized. More specifically, in the case of a CD-ROM reproduction system, access time must be within 1 second. Therefore, avoidance of this mistaken read-out operation is a must.

To avoid this situation, the read out data is checked in the following steps.

(B1) Control unit 11 reads out the present address $T_{PRS}$ by subcode Q detector 20 or header detector 27.

(B2) Control unit 11 computes a difference $T_{DIF}$ between the present address $T_{PRS}$ as read out and the last address $T_{LAST}$ previously read out, $$T_{DIF} = T_{PRS} - T_{LAST}.$$

If this difference $T_{DIF}$ is within a preset value, control circuit decides that the read out address $T_{PRS}$ is correct, and uses it in the operation for the data access.

(B3) Control unit 11 replaces address $T_{LAST}$ by the read out address $T_{PRS}$, independently of the decision result in step B2, and stores it into program RAM 24. Then, it returns to step B1, and uses it as the address $T_{LAST}$ for the read out address.

Subcode data Q and the header address data each include the absolute address. The absolute address of subcode data Q contains minute (MIN), second (SEC), and frame (FRAME) information. The absolute address of the head address data contains minute (MIN), second (SEC), and block (BLOCK) information. One frame or one block is reproduced every 1/75 sec. Therefore, when it is reproduced, the difference $T_{DIF}$ determined in step B2 is one frame (one block). One frame (one block) may be set as a preset value. In order to check if the read out data is correct, the continuity of the read out address data is checked.

Therefore, even if the data first read out after pick-up 15 is moved through the access operation is correct, control unit 11 decides that it is invalid because it is discontinuous to the address already read out. As a result, control unit 11 must wait until the data of one frame (one block) is reproduced. In other words, every time pick-up 15 is moved, the access operation suffers from time loss of one frame (one block) (1/75 sec.). For example, if pick-up 15 is moved five times during one access operation, the total loss time is 0.07 sec (=(1/75)×5).

Figure 3:
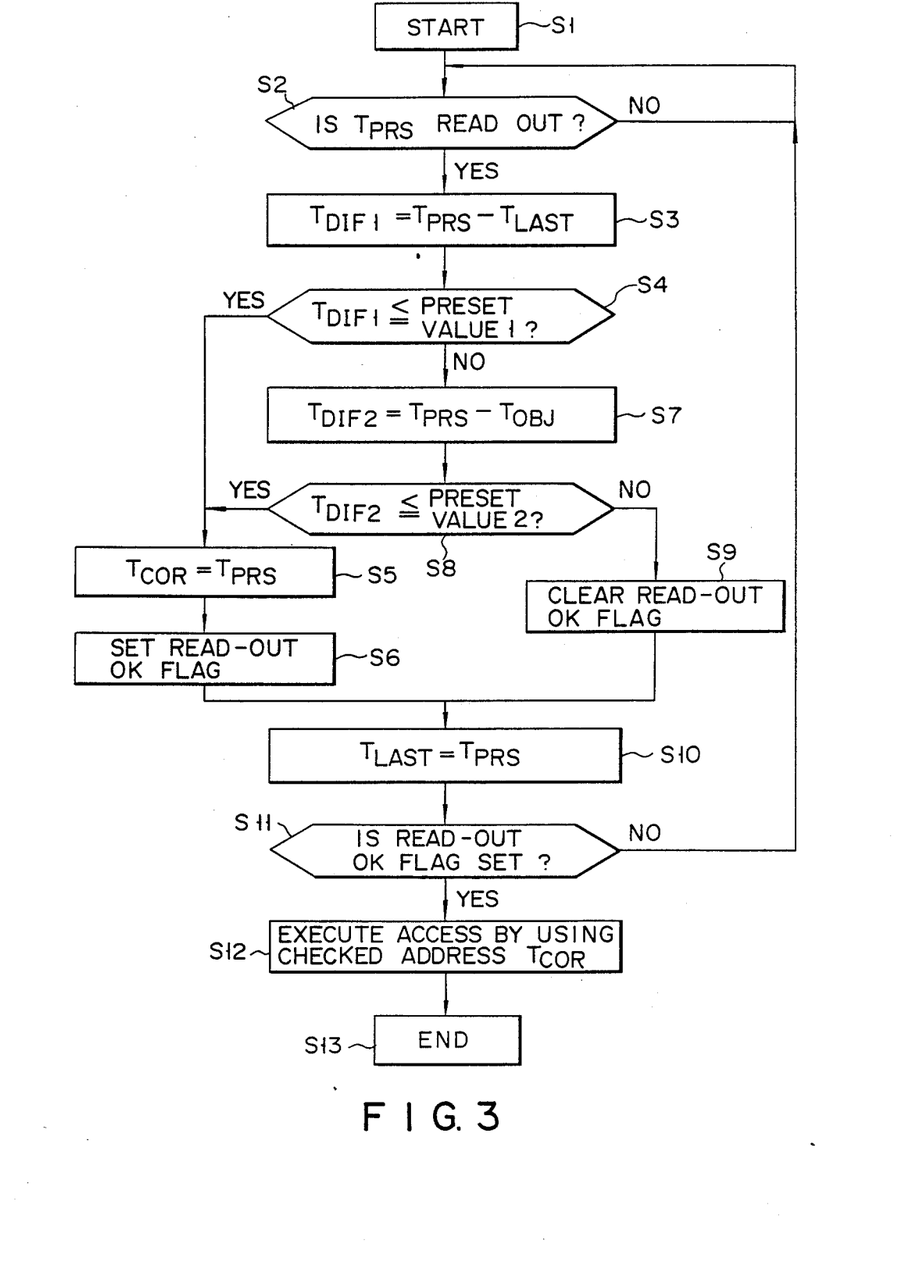
FIG. 3 shows a flowchart useful in explaining the data access operation of the disk reproduction apparatus shown in FIG. 1.

To solve this problem, the CD-ROM reproduction apparatus according to the present invention is designed to check the correctness of the read out data depending on a magnitude of the difference between the address data of the present position of pick-up 15 and the address data of the target position. How this check is performed will be elaborated referring to FIG. 3 showing a flowchart. (The present invention also checks the continuity of the address data.)

When the check process starts (step S1), control until 11 waits till the present address $T_{PRS}$ of pick-up 15 is read out by subcode Q detector 20 or header detector 27 (step S2). The control unit computes a difference $T_{DIF1}$ between the present address $T_{PRS}$ read out and the last address $T_{LAST}$ which was already read out and stored into program RAM 24. Accordingly, it perform the following steps (step S3):

$$T_{DIF1} = T_{PRS} - T_{LAST}.$$

Control unit 11 checks if the difference $T_{DIF1}$ is within a preset value 1 (step S4). In this case, the preset value 1 may be one frame (one block), as already described. There is the possibility that the frame per se may suffer from data error. The frame suffering from data error cannot be used as the preset value 1. If the preset value 1 is selected to be too large, the error data check will be abnormal. Therefore, 2 to 3 frames (blocks) are preferably selected for the preset value 1.

In step S4, if the difference $T_{DIF1}$ is within the preset value 1 or if the answer is YES, control unit 11 decides that the read out address data $T_{PRS}$ is correct. Control unit 11 will then use it in the access operation. Specifically, control unit 11 updates the checked address $T_{COR}$ to the present address $T_{PRS}$, and stores the updated one into program RAM 24 (step S5). Then, it sets a read-out OK flag (not shown) in step S6.

In step S4, if the difference $T_{DIF1}$ is not within the preset value, (the answer is NO), control unit 11 computes a difference $T_{DIF2}$ between the address $T_{OBJ}$ at the target position as specified by host computer 33 through host computer interface 32 and the present address $T_{PRS}$ as read out in step S2. In other words, the following operation is performed (step S7):

$$T_{DIF2} = T_{PRS} - T_{OBJ}.$$

Control unit 11 then checks to see if the computed difference $T_{DIF2}$ is within the preset value 2 (step S8).

If the answer is YES, control unit 11 proceeds to step S5. In this step, control unit 11 decides if the present address $T_{PRS}$ is correct. If it is, control unit 11 in the oration for the access operation. If the answer is NO in step S8, control unit 11 decides that the address invalid, and clears the read-out OK flag (step S9).

If the read-out OK flag is set in step S6 or if it is cleared in step S9, control unit 11 updates address $T_{LAST}$ to the present address $T_{PRS}$ read out in step S2, and stores the updated one into program RAM 24 (step S10). Subsequently, control unit 11 checks if the read-out OK flag is set (step S11). If the answer is YES, control unit 11 continues accessing data using the checked address $T_{COR}$ in program RAM 24 (step S12) and completes execution of the program to check if the address data is correct (step S13). Every time pick-up 15 is moved, this check program is executed. In step S11, if the answer is NO, (the read-out OK flag is not set) control unit 11 returns to step S2 and repeats the above sequence of operations.

As described above, the CD-ROM reproduction apparatus of the present invention, checks address continuity as does the conventional system. Additionally, however, the present invention checks to see if the difference between the present position of the pick-up and the target position is within a preset value 2. If it is within the preset value 2, the present address is handled as the correct address.

It is assumed that the preset value 2 is one minute in step S8. If the address read out after the movement of pick-up 15 due to the access operation is located within one minute of the address of the target position, the decision result of the address continuity is out of the preset value 1. In this case, however, the read out address is valid and may be handled as the correct address. Therefore, the CD-ROM reproduction apparatus is free from the lost time (1/75 sec), which is implicit in the conventional system. The present invention therefore is capable of high speed CD accesses.

In the above example, "one minute" is used for the preset value 2. The reason for this follows. Even if the decision is mistakenly made, pick-up 15 must not be allowed to move out of disk 16, (beyond the innermost and outermost periphery of the disk). In this respect, the read-out area expanding on the peripheral portion of disk 16 is one minute. Further, a tolerable landing error of pick-up 15 is approximately one minute.

As described above, the CD-ROM reproduction apparatus according to the present invention is capable of determining if the address read by the pick-up is correct or not. The present invention is also capable of high speed CD accesses.

It should be understood that the present invention is not limited to the specific embodiment as mentioned above, but may be changed and modified within the spirit and scope of the invention. For example, if a step to check if the picked up data is in BCD format, were used, the error check may be considered within the scope of the invention.

What is claimed is:

1. An apparatus for controlling reproduction of information data recorded on a disk, the disk having a plurality of data blocks recorded thereon, each of said data blocks including a predetermined number of information data and address data which corresponds to each of said data blocks, said disk reproduction apparatus comprising:
   inputting means for inputting target address data, the target address data representing the address of the data block containing the desired information data;
   pick-up means for reading the information data and address data from the disk;
   memory means for storing the address data read by said pick-up means;
   first calculating means for calculating the difference between the address data stored in said memory means and the address data currently read by said pick-up means;
   second calculating means for calculating the difference between the address data currently read by said pick-up means and the target address data;
   control means for accepting the address data currently read by said pick-up means as being correct when either of the differences calculated by said first and second calculating means is within a preset value; and
   update means for updating the address data stored in said memory means with the address data currently read by said pick-up means.

2. The apparatus according to claim 1, wherein said control means includes means for using the address data currently read by said pick-up means to access the target address represented by the target address data.

3. The apparatus according to claim 1, wherein said control means includes:
   first determining means for checking if the difference calculated by said first calculating means is within a first preset value;
   second determining means for checking if the difference calculated by said second calculating means is within a second preset value; and
   processing means, when said first and second determining means determine that either of the differences is within said first or second preset values respectively, for accepting the address data currently read by said pick-up means as being correct in order to access the target address represented by the target address data.

4. The apparatus according to claim 3, wherein the first preset value includes a value corresponding to one of 1 to 3 data blocks.

5. The apparatus according to claim 3, wherein the second preset value includes a value corresponding to one minute.

6. The apparatus according to claim 1, wherein said control means includes means for causing said pick-up means to read the address data contained in the next data block when neither of the differences calculated by said first and second calculating means is within said preset value.

7. An apparatus for controlling reproduction of information data recorded on a disk, the disk having a plurality of data blocks recorded thereon, each of said data blocks including a predetermined number of information data and address data which corresponds to each of said data blocks, said disk reproduction apparatus comprising:
   pick-up means for reading the information data and address data from the disk;
   receiving means for receiving target address data which represents the address of the data block containing the desired information data to be reproduced;
   memory means for storing the address data contained in the data block read by said pick-up means;
   first calculating means for calculating a first difference between the address data stored in said memory means and the address data currently read by said pick-up means;
   first determining means for checking if the first difference calculated by said first calculating means is within a first preset value;
   second calculating means for calculating a second difference between the address data currently read by said pick-up means and the target address data received by said receiving means, when said first determining means determines that the first difference is not within the first preset value;
   second determining means for checking if the second difference calculated by said second calculating means is within a second preset value;
   control means, when said first determining means determines that the first difference is within the first preset value, and also when said second determining means determines that the second difference is within the second preset value, for accepting the address data currently read by said pick-up means as being correct; and
   update means for updating the address data stored in said memory means so as to correspond to the address data currently read by said pick-up means.

8. The apparatus according to claim 7, wherein said control means includes means for using the address data currently read by said pick-up means to access the target address represented by the target address data.

9. The apparatus according to claim 7, wherein the first preset value includes a value corresponding to one of 1 to 3 data blocks.

10. The apparatus according to claim 7, wherein the first preset value includes a value corresponding to one minute.

11. The apparatus according to claim 7, further comprising:
- means for causing said pick-up means to read the address data contained in the next data block, when said second decision means decides that the second difference is not within the second preset value.

12. A method for accessing desired information data recorded on a disk, the disk having a plurality of data blocks recorded thereon, each of said data blocks including a predetermined number of information data and address data which corresponds to each of said data blocks, said method comprising the steps of:
- setting target address data which represents the address of the data block containing the desired information data to be reproduced;
- reading the information data and address data from the disk by a pick-up means;
- storing the address data contained in the data block read by said pick-up means into memory means;
- calculating a first difference between the address data stored in said memory means and the address data currently read by said pick-up means;
- checking if said first difference is within a first preset value;
- calculating a second difference between the address data currently read by said pick-up means and the target address data, when said first difference is not within the first preset value;
- checking if said second difference calculated is within a second preset value;
- accepting the address data currently read by said pick-up means as being correct, when the first difference is within the first preset value, and also when said second difference is within the second preset value; and
- updating the address data stored in said memory means so as to correspond to the address data currently read by said pick-up means.

13. The method according to claim 12, wherein the first preset value includes a value corresponding to one of 1 to 3 data blocks.

14. The method according to claim 12, wherein the second preset value includes a value corresponding to one minute.

15. The method according to claim 12, further comprising the step of:
- causing said pick-up means to read the address data contained in the next data block, when said second difference is not within the second preset value.

* * * * *